J. L. DUFF.
NON-SKID ATTACHMENT FOR TIRES.
APPLICATION FILED APR. 21, 1915.
1,157,928. Patented Oct. 26, 1915.
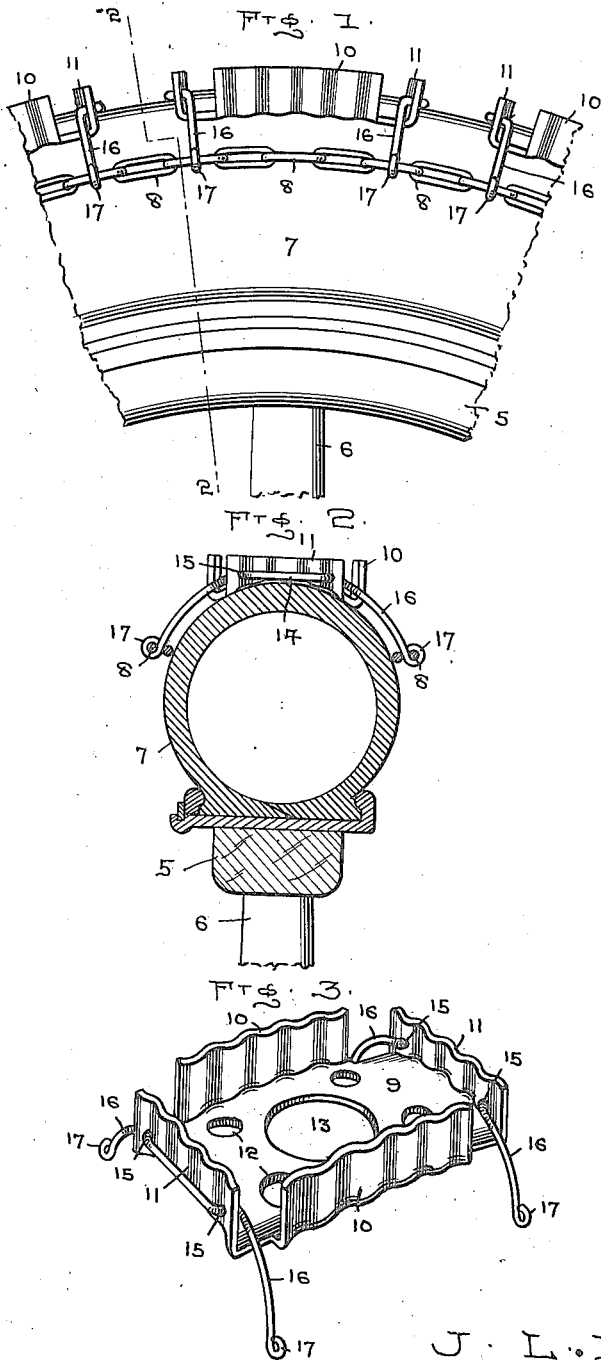

UNITED STATES PATENT OFFICE.

JOHN L. DUFF, OF CAMBRIDGE, OHIO.

NON-SKID ATTACHMENT FOR TIRES.

1,157,928. Specification of Letters Patent. Patented Oct. 26, 1915.

Application filed April 21, 1915. Serial No. 22,856.

*To all whom it may concern:*

Be it known that I, JOHN L. DUFF, a citizen of the United States, residing at Cambridge, in the county of Guernsey and State of Ohio, have invented certain new and useful Improvements in Non-Skid Attachments for Tires; and I do hereby declare the following to be a full, clear, and exact description of the invention, such as will enable others skilled in the art to which it appertains to make and use the same.

This invention is in the nature of a non-skid attachment for tires, and particularly for resilient pneumatic tires such as are used on automobiles and other motor vehicles.

The primary object of the invention is to provide improved means for attachment upon pneumatic tires which will prevent skidding, creeping or slipping.

With this object in view the invention consists in the improved construction, arrangement and combination of the parts of an attachment of the character specified, which will be hereinafter fully described and afterward specifically claimed.

In order that the construction and operation thereof may be readily comprehended, I have illustrated an approved embodiment of my invention in the accompanying drawings, and will now proceed to fully describe the same in connection with said drawings, in which—

Figure 1 represents, in side elevation, a part of the rim and tire of a wheel having a section of my improved attachment mounted thereon, Fig. 2 represents a sectional view thereof taken on the radial plane indicated by the dotted line 2—2 of Fig. 1, and Fig. 3 represents, in perspective, a section of my attachment, detached from the tire.

Referring specifically to the drawings, 5 indicates the rim, 6 the spoke and 7 the pneumatic tire of a wheel such as are used on automobiles.

My improved attachment consists of sections or parts as indicated in Fig. 3 of the drawings, which are placed upon the outside of the tire and connected together by chains 8 shown in Figs. 1 and 2.

Each section of my attachment comprises a base plate 9 curved to fit upon the outside of the tire, side plates or flanges 10 substantially at right angles to the base 9 and end plates or flanges 11 also substantially at right angles to the base 9.

The base is provided with a number of openings as at 12 13 for purposes hereinafter set forth and the side plates and end plates 10 and 11 are corrugated from end to end.

Attaching clips 14 composed of steel rods embrace the end plates 11 on their outer sides, pass through openings 15 in said end plates and are curved downwardly at each end as at 16 to fit over the tire, being also provided at their outer ends with eyes 17 to engage the chains 8 which pass entirely around the tire at a short distance from the sides of the central periphery thereof.

When the sections are laid upon the outside of the tires and attached to the chains 8, as heretofore described, they will be firmly held upon the tire, the side plates 10 and end plates 11 forming really the tread, the side plates preventing sidewise skidding or slipping and the end plates preventing forward and backward skidding or slipping. By corrugating these flange plates, they are rendered extremely stiff and strong.

Clips 14 have bearings upon both the inner and outer faces of the end plates 11, their right angle bends where they pass through the openings 15 preventing any sidewise movement.

The holes 12 13 serve to keep the tread clear of slush or mud.

The utility and simplicity of my attachment will be evident from the foregoing and I desire to be understood that changes and variations may be made from the specific construction described, without departing from the spirit and scope of the invention.

Having thus fully described my invention, what I claim as new and desire to secure by Letters Patent of the United States is:—

1. A non-skid attachment for tires, comprising base plates curved to fit the tread of the tire, upstanding flanges across the ends of the base plates, each flange having an opening adjacent each end, a fastening clip lying flat against the outer face of each flange, the ends of each clip being extended through said openings and extended parallel with the inner face of the flange, said ends being curved and extended a distance beyond the edges of the base plates and provided at their extremities with eyes, and chains surrounding the tire and connected with said eyes to hold the attachment to the tire.

2. The herein described non-skid attachment for tires comprising sections, each consisting of a base plate curved to fit the tread of the tire, end flange plates projecting outwardly therefrom, fastening clips comprising a main body embracing the end plates on their outer sides, right angular bends passing through openings in the end plates, and curved ends fitting transversely over the tire, said curved ends being provided with eyes at their extremities, and a chain surrounding the tire at a short distance on each side of the central peripheral line thereof and engaging the eyes of said clips.

In testimony whereof I have signed my name to this specification in the presence of two subscribing witnesses.

JOHN L. DUFF.

Witnesses:
S. M. SECREST,
W. W. STEWART.